(12) United States Patent
Carrillo et al.

(10) Patent No.: US 11,817,758 B2
(45) Date of Patent: Nov. 14, 2023

(54) FLUID PUMP AND BRUSH SPRING RETAINER THEREOF

(71) Applicant: DELPHI TECHNOLOGIES IP LIMITED, St. Michael (BB)

(72) Inventors: Conrado Carrillo, Chihuahua (MX); Aldo Venegas, Chihuahua (MX)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 454 days.

(21) Appl. No.: 17/024,997

(22) Filed: Sep. 18, 2020

(65) Prior Publication Data

US 2022/0094235 A1  Mar. 24, 2022

(51) Int. Cl.
| | |
|---|---|
| *H02K 5/14* | (2006.01) |
| *H01R 39/38* | (2006.01) |
| *H02K 23/04* | (2006.01) |
| *F04D 25/06* | (2006.01) |
| *H01R 39/06* | (2006.01) |
| *F02M 37/10* | (2006.01) |

(52) U.S. Cl.
CPC ......... *H02K 5/145* (2013.01); *F04D 25/0693* (2013.01); *H01R 39/06* (2013.01); *H01R 39/381* (2013.01); *H02K 23/04* (2013.01); *F02M 37/10* (2013.01)

(58) Field of Classification Search
CPC ...... F02M 37/08; F02M 37/048; F02M 37/10; F02M 39/02; F02M 2037/085; F04D 5/00; F04D 13/06; F04D 13/0653; F04D 25/0693; F04D 29/5806; H01R 39/381; H01R 39/06; H02K 5/145; H02K 5/148; H02K 13/10; H02K 13/105; H02K 23/04

USPC .................................................. 310/237, 247
See application file for complete search history.

(56) References Cited

U.S. PATENT DOCUMENTS

| | | | |
|---|---|---|---|
| 9,476,392 B2* | 10/2016 | Talaski | H02K 11/40 |
| 2003/0185693 A1 | 10/2003 | Iwanari | |
| 2007/0013260 A1* | 1/2007 | Muramatsu | H02K 23/66 310/248 |
| 2008/0063545 A1* | 3/2008 | Takagi | F04B 17/03 417/410.1 |

(Continued)

FOREIGN PATENT DOCUMENTS

WO    2014127440 A1    8/2014

*Primary Examiner* — Devon C Kramer
*Assistant Examiner* — Joseph S. Herrmann
(74) *Attorney, Agent, or Firm* — WARNER NORCROSS + JUDD LLP

(57) ABSTRACT

A fluid pump includes an electric motor having an armature with a commutator and a motor frame which supports a pair of permanent magnets which are located radially outward from the armature. The motor frame has a support stem extending axially in a direction away from the commutator. A pump section is rotationally coupled to the electric motor and pumps the fluid. First and second motor brushes deliver electricity to the commutator and are urged into electrical contact with the commutator by a first and second springs. The first and second springs are mechanically grounded to a brush spring retainer fixed to the motor frame. The brush spring retainer includes a central portion having an opening within which the support stem is received in an interference fit. A support arm extends from the central portion such that the first and second springs are mechanically grounded to the support arm.

18 Claims, 5 Drawing Sheets

(56) References Cited

U.S. PATENT DOCUMENTS

| | | | |
|---|---|---|---|
| 2010/0287771 A1 | 11/2010 | Takagi et al. | |
| 2014/0314591 A1* | 10/2014 | Herrera | F04D 5/002 |
| | | | 417/321 |
| 2015/0104339 A1* | 4/2015 | Fischer | H01R 39/36 |
| | | | 417/423.7 |
| 2017/0023022 A1 | 1/2017 | Herrera et al. | |
| 2018/0258893 A1* | 9/2018 | Fischer | F02M 37/106 |

* cited by examiner

FLUID PUMP AND BRUSH SPRING RETAINER THEREOF

TECHNICAL FIELD OF INVENTION

The present disclosure relates to a fluid pump; more particularly to a fuel pump; even more particularly to a fuel pump with an electric motor; and still even more particularly to such a fuel pump which includes a brush spring retainer which retains a pair of brush springs which urge motor brushes into contact with a commutator of the electric motor.

BACKGROUND OF INVENTION

Fluid pumps, and more particularly fuel pumps for pumping fuel, for example, from a fuel tank of a motor vehicle to an internal combustion engine of the motor vehicle, are known. It is common for such fuel pumps to include an electric motor to rotate a pumping element which pumps fuel from an inlet of the fuel pump to an outlet of the fuel pump. In order to communicate an electric current to a rotating armature of the electric motor, it is common to provide a pair of carbon brushes which are in electrical contact with a commutator of the armature where each carbon brush is urged into electrical contact with a respective brush spring. One end of each brush spring acts against its respective carbon brush while the other end of each brush spring is mechanically grounded to a stationary element of the fuel pump. PCT Patent Application Publication No. WO 2014/127440 to Da Silva discloses that the brush springs are mechanically grounded to respective electrical terminals. The electrical terminals provide an electrical interface with complementary mating terminals of a wire harness to supply electricity to the fuel pump. However, this requires that the electrical terminals include geometries that are intricate and may be difficult and costly to form. United States Patent Application Publication No. US 2003/0185693 A1 to Iwanari discloses that the brush springs are mechanically grounded to an end cap of the fuel pump. However, such an arrangement may be difficult to assemble because the brushes and the brush springs are entirely enclosed within the fuel pump and therefore must be aligned blindly.

What is needed is a fluid pump which minimizes or eliminates one or more of the shortcomings as set forth above.

SUMMARY OF THE INVENTION

Briefly described, a fluid pump includes a hollow housing; an electric motor located within the hollow housing and having an armature with a commutator, the armature being rotatable about an axis with application of an electric current to the commutator, the electric motor also having a motor frame which supports a pair of permanent magnets which are located radially outward from the armature, the motor frame having a support stem extending axially away therefrom in a direction away from the commutator; a pump section rotationally coupled to the electric motor which receives fluid at a relatively low pressure through a fluid inlet and which pressurizes the fluid to a relatively high pressure as a result of rotation of the armature; a first motor brush and a second motor brush which deliver the electric current to the commutator and which are urged into electrical contact with the commutator by a first brush spring and a second brush spring respectively; and a brush spring retainer upon which the first brush spring and the second brush spring are each mechanically grounded, thereby causing the first brush spring and the second brush spring to hold the first motor brush and the second motor brush respectively in contact with the commutator. The brush spring retainer includes a brush spring retainer central portion which extends along the axis and which includes a brush spring retainer opening therein within which the support stem is received in an interference fit which retains the brush spring retainer to the motor frame; and a brush spring retainer support arm which extends from the brush spring retainer central portion in a direction laterally relative to the axis, wherein the first brush spring and the second brush spring are mechanically grounded to the brush spring retainer support arm. The fluid pump with brush spring retainer as disclosed herein allows for ease of assembly which minimizes cost and also eliminates the need for costly and complex electrical terminals which are used in the prior art.

BRIEF DESCRIPTION OF DRAWINGS

This invention will be further described with reference to the accompanying drawings in which.

DETAILED DESCRIPTION OF INVENTION

Figure 1:
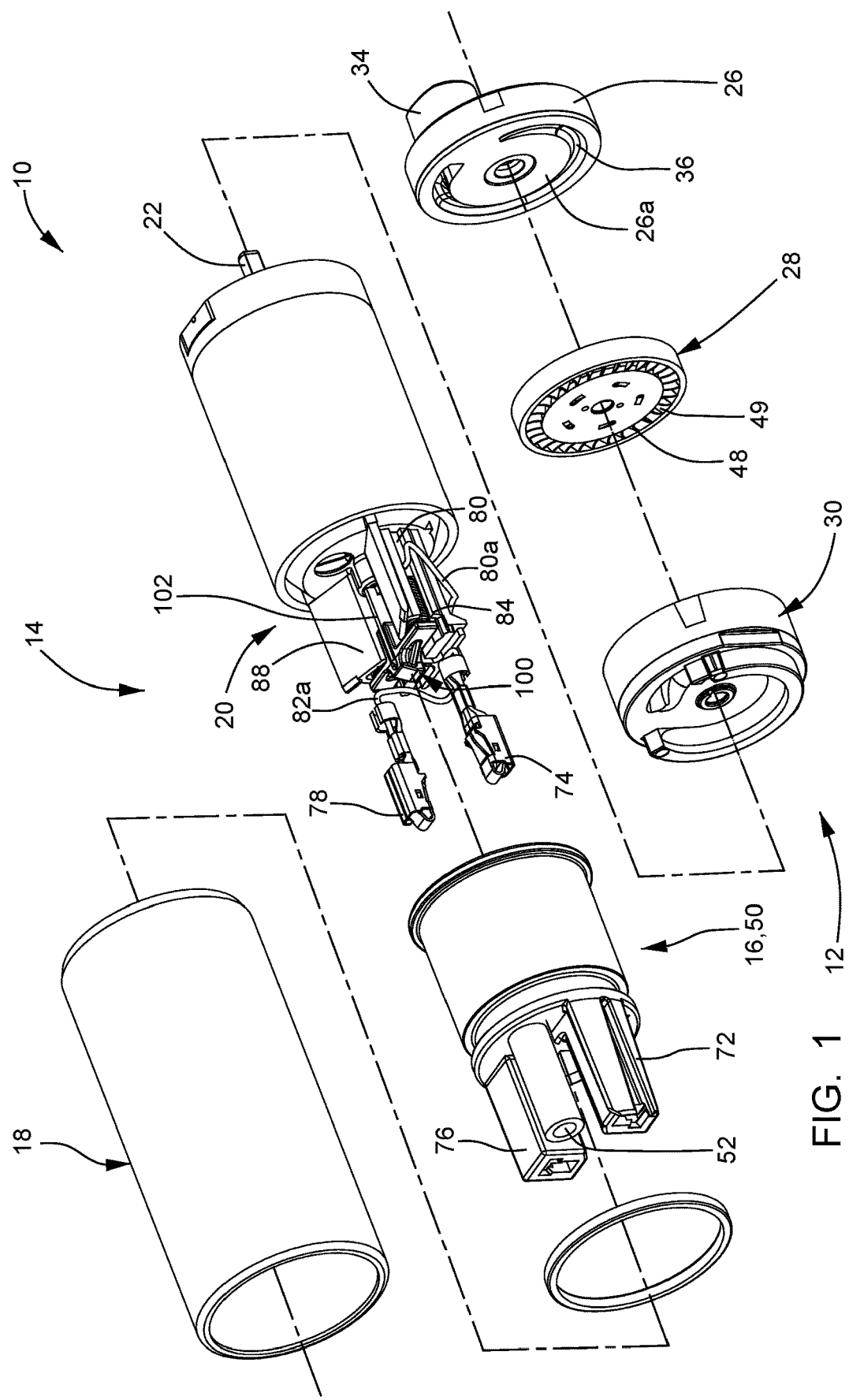
FIG. 1 is an exploded isometric view of a fluid pump in accordance with the present disclosure.
Figure 2:
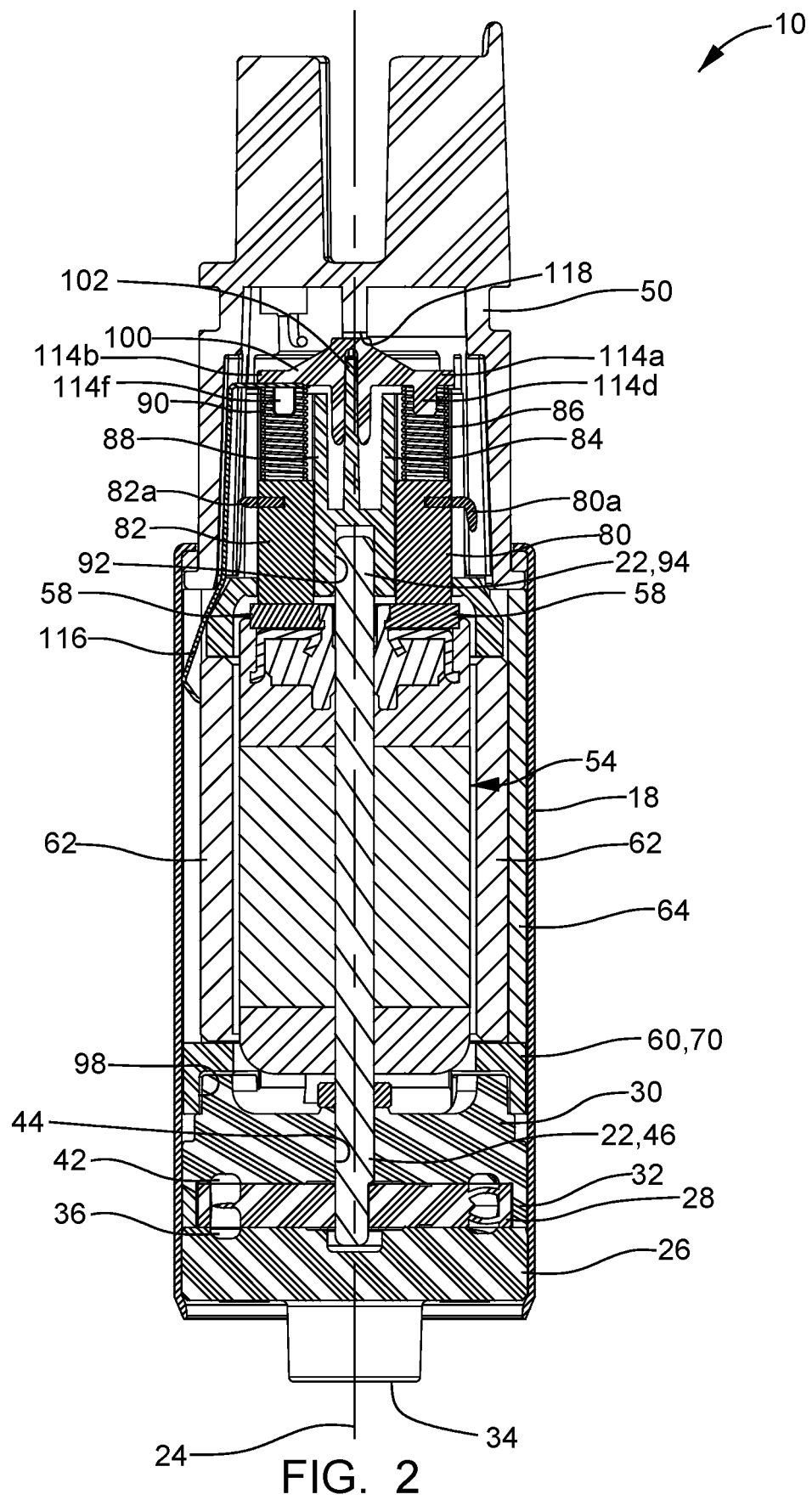
FIG. 2 is an axial cross-sectional view of the fluid pump in accordance with the present disclosure.

Reference will first be made to FIGS. 1 and 2 which are an exploded isometric view and an axial cross-sectional view respectively of a fluid pump illustrated as fuel pump 10 for pumping liquid fuel, for example gasoline or diesel fuel, from a fuel tank (not shown) to an internal combustion engine (not shown). While the fluid pump is illustrated as fuel pump 10, it should be understood that the invention is not to be limited to a fuel pump, but could also be applied to fluid pumps for pumping fluids other than fuel. Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18 which is hollow. Electric motor 20 includes a shaft 22 extending therefrom into pump section 12. Shaft 22 rotates about an axis 24 when an electric current is applied to electric motor 20. Electric motor 20 will be described in greater detail later.

With continued reference to FIGS. 1 and 2, pump section 12 includes an inlet plate 26, a pumping member which is illustrated as an impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of axis 24, i.e. the dimension of spacer ring 32 in the direction of axis 24 is greater than the dimension of impeller 28 in the direction of axis 24. In this way, inlet plate 26, outlet plate 30, and spacer ring 32 are fixed within housing 18, for example by crimping the end of housing 18 proximal to outlet plate 30. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet 34 that extends through inlet plate 26 in the same direction as axis 24. Inlet 34 is a passage which introduces fuel into fuel pump 10. Inlet plate 26 also includes an inlet plate flow channel 36 formed in an inlet plate face 26a of inlet plate 26 that faces toward impeller 28. Inlet plate flow channel 36 is in fluid communication with inlet 34. Inlet plate 26 and inlet plate flow channel 36 will be described in greater detail later.

Outlet plate 30 is generally cylindrical in shape and includes an outlet plate outlet passage 40 (shown in FIG. 3) that extends through outlet plate 30 in the same direction as axis 24. Outlet plate outlet passage 40 is in fluid communication with outlet section 16 as will be describe in more detail later. Outlet plate 30 also includes an outlet plate flow channel 42 formed in the face of outlet plate 30 that faces toward impeller 28. Outlet plate flow channel 42 is in fluid communication with outlet plate outlet passage 40. Outlet plate 30 also includes an outlet plate aperture, hereinafter referred to as lower bearing 44, extending through outlet plate 30. Shaft 22 extends through lower bearing 44 in a close fitting relationship such that shaft 22 is able to rotate freely within lower bearing 44 such that radial movement of shaft 22 within lower bearing 44 is substantially prevented. In this way, lower bearing 44 radially supports a lower end 46 of shaft 22 that is proximal to pump section 12.

Impeller 28 includes a plurality of blades 48 arranged in a polar array radially surrounding, and centered about, axis 24 such that blades 48 are aligned with inlet plate flow channel 36 and outlet plate flow channel 42. Blades 48 are each separated from each other by a blade chamber 49 that passes through impeller 28 in the general direction of axis 24. Impeller 28 may be made, for example only, by a plastic injection molding process in which the preceding features of impeller 28 are integrally molded as a single piece of plastic.

Outlet section 16 includes an end cap 50 having an outlet 52 for discharging fuel from fuel pump 10. Outlet 52 may be connected to, for example only, a conduit (not shown) for supplying fuel to an internal combustion engine (not shown). Outlet 52 is in fluid communication with outlet plate outlet passage 40 of outlet plate 30 for receiving fuel that has been pumped by pump section 12.

With continued reference to FIGS. 1 and 2 and with additional reference to FIGS. 3-6, electric motor 20 includes a rotor or armature 54 with a plurality of circumferentially spaced motor windings 56 and a commutator 58, a motor frame 60, a pair of permanent magnets 62, and a flux carrier 64. Each magnet 62 is in the shape of a segment of a hollow cylinder. Motor frame 60 includes a top section 66 that is proximal to outlet section 16, a plurality of circumferentially spaced motor frame legs 68 extending axially from top section 66 toward pump section 12, and a base section 70 axially spaced apart from top section 66 by motor frame legs 68. Top section 66, motor frame legs 68, and base section 70 are preferably integrally formed from a single piece of plastic, for example only, by a plastic injection molding process.

End cap 50 is made of an electrically insulative material, for example plastic, and includes a first electrical terminal tower 72 within which is received and retained a first electrical terminal 74 and also includes a second electrical terminal tower 76 within which is received and retained a second electrical terminal 78. First electrical terminal tower 72 and second electrical terminal tower 76 provide electrical separation between first electrical terminal 74 and second electrical terminal 78, position first electrical terminal 74 and second electrical terminal 78 in a predetermined relationship in order to provide to a connection with a mating electrical connector (not shown) for supplying fuel pump 10 with electricity for operation thereof, and provide complementary features for interfacing with the mating electrical connector. In use, first electrical terminal 74 and second electrical terminal 78 are connected to an electricity source (not shown) and are of opposite polarity.

First electrical terminal 74 is in electrical communication with a first motor brush, hereinafter first carbon brush 80, via a first shunt wire 80a while second electrical terminal 78 is in electrical communication with a second motor brush, hereinafter second carbon brush 82, via a second shunt wire 82a. First carbon brush 80 is disposed within a first brush holder 84 which is integrally formed by top section 66 and is urged into contact with commutator 58 of armature 54 by a first brush spring 86. Second carbon brush 82 is disposed within a second brush holder 88 which is integrally formed by top section 66 and is urged into contact with commutator 58 of armature 54 by a second brush spring 90. First brush holder 84 and second brush holder 88 capture first carbon brush 80 and second carbon brush 82 respectively in a direction laterally relative to axis 24 while allowing first carbon brush 80 and second carbon brush 82 to slide in a direction parallel to axis 24. First carbon brush 80 and second carbon brush 82 deliver electrical power to motor windings 56 via commutator 58, thereby rotating armature 54 and shaft 22 about axis 24.

Top section 66 of motor frame 60 defines an upper bearing 92 therein which radially supports an upper end 94 of shaft 22 that is proximal to outlet section 16. Shaft 22 is able to rotate freely within upper bearing 92 such that radial movement of shaft 22 within upper bearing 92 is substantially prevented.

Motor frame legs 68 are preferably equally circumferentially spaced around top section 66 and base section 70 and define motor frame openings 96 between motor frame legs 68. Motor frame openings 96 extend axially from top section 66 to base section 70. One magnet 62 is disposed within each motor frame opening 96. Magnets 62 may be inserted within respective motor frame openings 96 after motor frame 60 has been formed. Alternatively, magnets 62 may be insert molted with motor frame 60 when motor frame 60 is formed by a plastic injection molding process. In this way, magnets 62 and motor frame legs 68 radially surround armature 54. While two motor frame legs 68 and two magnets 62 have been illustrated, it should be understood that other quantities of motor frame legs 68 and magnets 62 may be used.

Base section 70 may be annular in shape and connects motor frame legs 68 to each other. Base section 70 includes a base section recess 98 extending axially thereinto from the end of base section 70 that faces away from top section 66. Base section recess 98 is coaxial with upper bearing 92 and receives outlet plate 30 therein.

Flux carrier 64 is made of a ferromagnetic material and may take the form of a cylindrical tube. Flux carrier 64 closely radially surrounds motor frame legs 68 of motor frame 60 and magnets 62. Flux carrier 64 may be made, for example only, from a sheet of ferromagnetic material formed to shape by a rolling process. Flux carrier 64 is captured axially between end cap 50 and an upper surface of base section 70.

In order to provide a mechanical ground for first brush spring 86 and second brush spring 90 to act against, fuel pump 10 includes a brush spring retainer 100 which is fixed to motor frame 60. More specifically, motor frame 60 includes a support stem 102, extending axially away therefrom in a direction away from commutator 58, to which brush spring retainer 100 is fixed. As illustrated in the figures, a portion of support stem 102 may extend from the portion of top section 66 which defines upper bearing 92 and is located between first brush holder 84 and second brush holder 88.

As mentioned previously, brush spring retainer 100 is provided and fixed to motor frame 60 in order to provide a mechanical ground for first brush spring 86 and second brush spring 90. In this way, first brush spring 86 and second brush spring 90 hold first carbon brush 80 and second carbon brush 82 respectively in contact with commutator 58, thereby delivering electrical current to commutator 58. Brush spring retainer 100 includes a brush spring retainer central portion 104 which extends along axis 24 and which includes a brush spring retainer opening 106 therein. Support stem 102 of motor frame 60 is received within brush spring retainer opening 106 in an interference fit which retains brush spring retainer 100 to motor frame 60. Brush spring retainer opening 106 is formed by a first brush spring retainer leg 108 and by a second brush spring retainer leg 110 which are spaced apart from each other in a direction lateral relative to axis 24. In this way, brush spring retainer opening 106 is located between first brush spring retainer leg 108 and second brush spring retainer leg 110. First brush spring retainer leg 108 and second brush spring retainer leg 110 each have a respective rib facing toward brush spring retainer opening 106 and each respective ridge having a ridgeline that extends along axis 24. The ridgelines of the respective ribs each engage support stem 102 in a line contact which may minimize insertion force when support stem 102 is inserted into brush spring retainer opening 106. First brush spring retainer leg 108 and second brush spring retainer leg 110 are connected to each other only at respective first ends thereof, which are distal from commutator 58, by a brush spring retainer joining section 112, thereby causing respective second ends of first brush spring retainer leg 108 and second brush spring retainer leg 110 to be elastically displaced from each other by the interference fit between support stem 102 and brush spring retainer central portion 104.

Brush spring retainer 100 also includes a brush spring retainer support arm 114 which extends from brush spring retainer central portion 104 in a direction laterally relative to axis 24. Brush spring retainer support arm 114 extends sufficiently far so to as to be aligned with first brush holder 84 and second brush holder 88 in a direction parallel to axis 24 such that first brush spring 86 and second brush spring 90 are mechanically grounded to brush spring retainer support arm 114. Brush spring retainer support arm 114 includes a support arm first portion 114a which extends from first brush spring retainer leg 108 and also includes a support arm second portion 114b which extends from second brush spring retainer leg 110. As can be seen in the figures, a portion of brush spring retainer opening 106 is located laterally between support arm first portion 114a and support arm second portion 114b.

Support arm first portion 114a includes a first lower surface 114c with which first brush spring 86 is engaged. In order to maintain the positioning of first brush spring 86 on support arm first portion 114a, support arm first portion 114a includes a first protrusion 114d extending from first lower surface 114c in a direction toward commutator 58. First brush spring 86 is a coil compression spring and includes one or more coils at a first end thereof which circumferentially surround first protrusion 114d such that first protrusion 114d limits movement of first brush spring 86 in a direction laterally relative to axis 24.

Similarly, support arm second portion 114b includes a second lower surface 114e with which second brush spring 90 is engaged. In order to maintain the positioning of second brush spring 90 on support arm second portion 114b, support arm second portion 114b includes a second protrusion 114f extending from second lower surface 114e in a direction toward commutator 58. Second brush spring 90 is a coil compression spring and includes one or more coils at a first end thereof which circumferentially surround second protrusion 114f such that second protrusion 114f limits movement of second brush spring 90 in a direction laterally relative to axis 24. Second protrusion 114f differs from first protrusion 114d in that second protrusion 114f includes a protrusion slot 114g which extends thereinto from the end of second protrusion 114f that is distal from support arm second portion 114b and may extend to, or even into, second lower surface 114e. Protrusion slot 114g is provided to capture one end of a ground wire 116 therein such that second brush spring 90 rests upon ground wire 116 in electrical contact therewith. In this way, ground wire 116 is captured axially between second brush spring 90 and brush spring retainer support arm 114. The other end of ground wire 116 is in electrical contact with housing 18. Second carbon brush 82 is the ground brush for electric motor 20, and consequently, ground wire 116 electrically grounds housing 18 via second brush spring 90, second carbon brush 82, second shunt wire 82a, and second electrical terminal 78.

Brush spring retainer joining section 112 extends axially beyond brush spring retainer support arm 114 and fits within a recess 118 of end cap 50. It should be noted that only a portion of brush spring retainer central portion 104, which includes brush spring retainer joining section 112, is received within recess 118. A clearance is provided between recess 118 brush spring retainer support arm 114 in order to prevent interference which could prevent proper assembly. However, recess 118 is minimized in size to prevent disengagement of brush spring retainer 100 from support stem 102 when fuel pump 10 is fully assembled.

The preceding elements and features of brush spring retainer 100 are integrally formed as a single piece of electrically insulative material, preferably plastic and may be manufactured, for example, in a plastic injection molding process.

Figure 3:
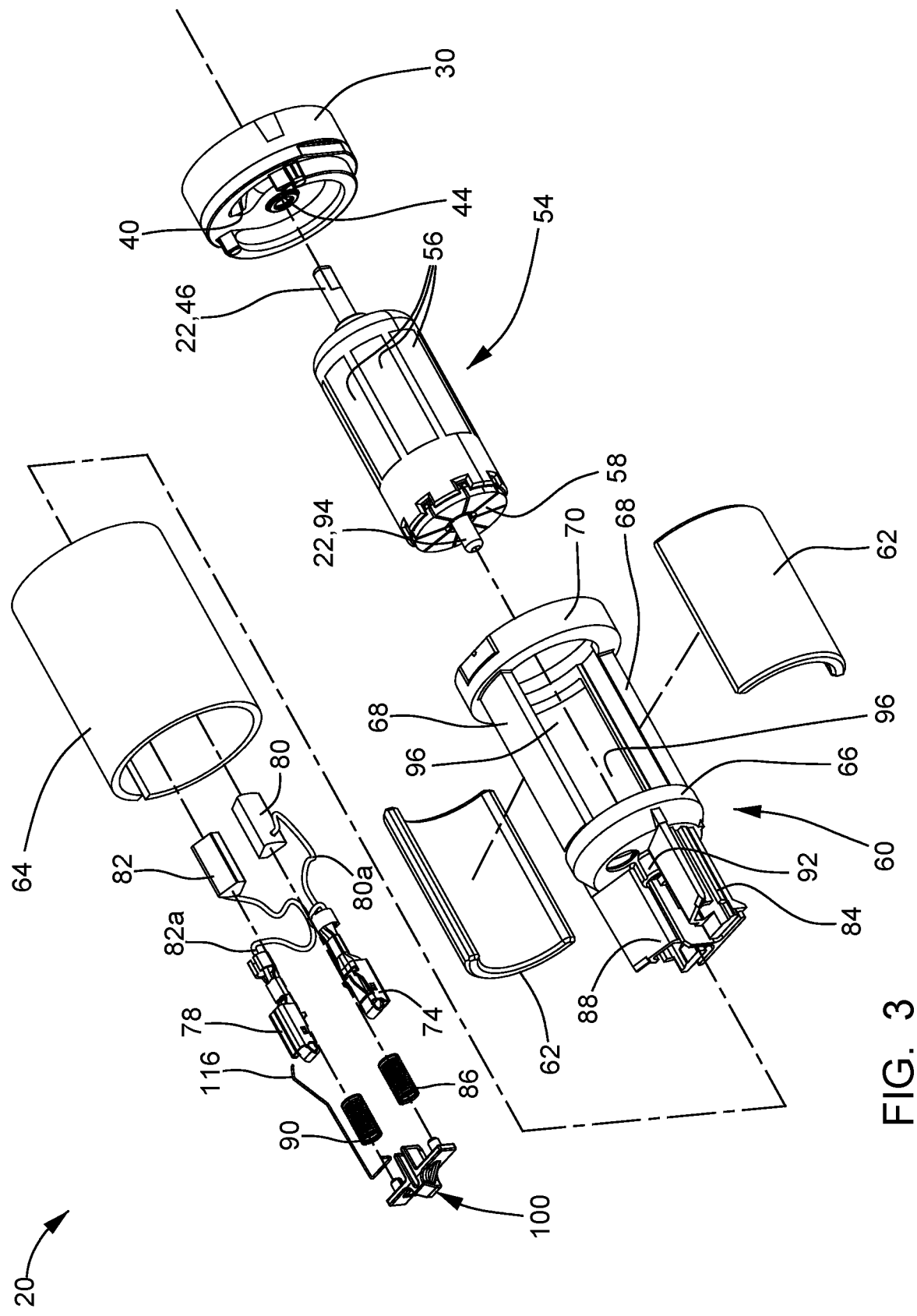
FIG. 3 is an exploded isometric view of a portion of the fluid pump in accordance with the present disclosure.
Figure 4:
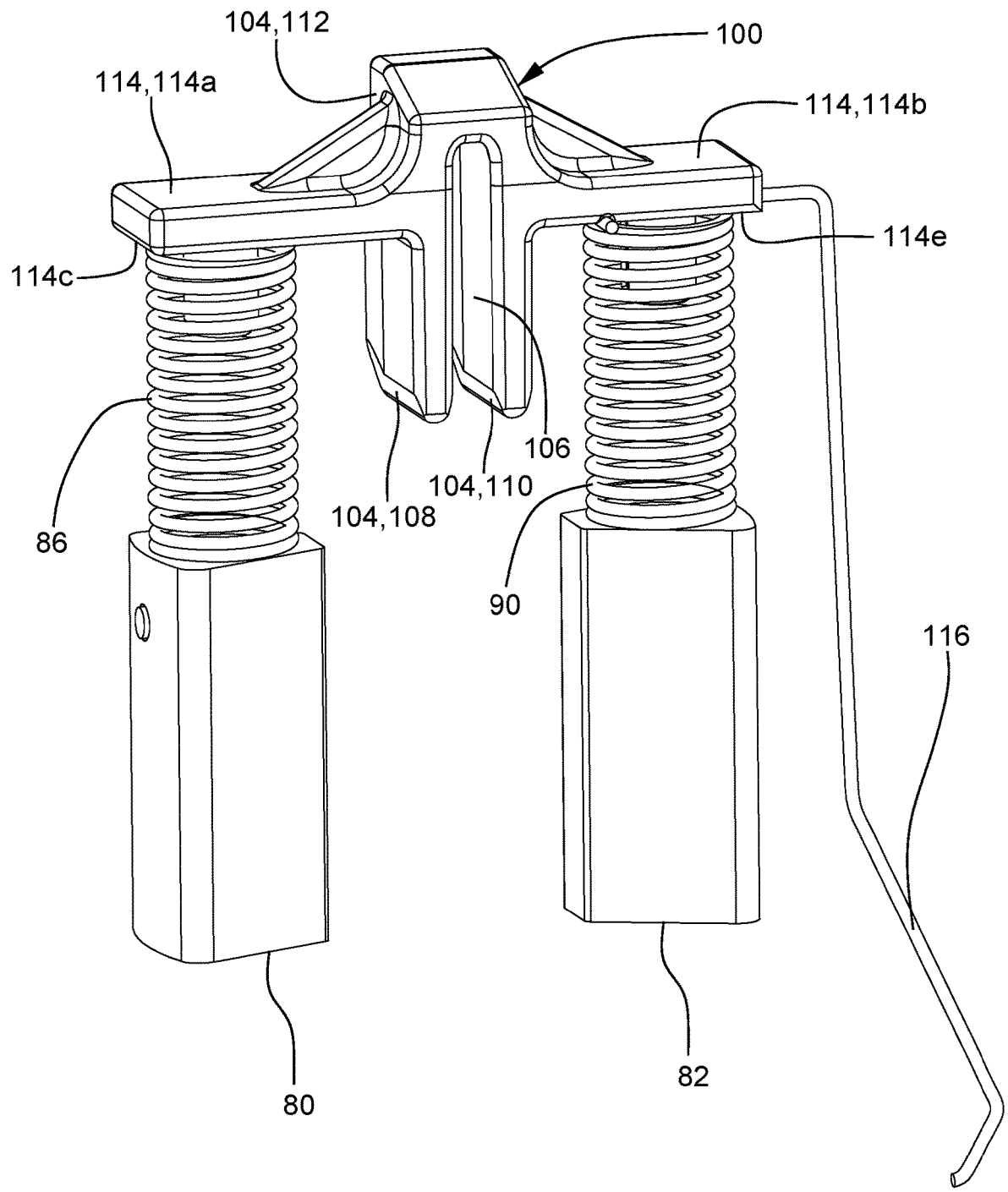
FIG. 4 is an isometric view of a brush spring retainer, motor brushes, brush springs, and ground wire of the fluid pump.
Figure 5:
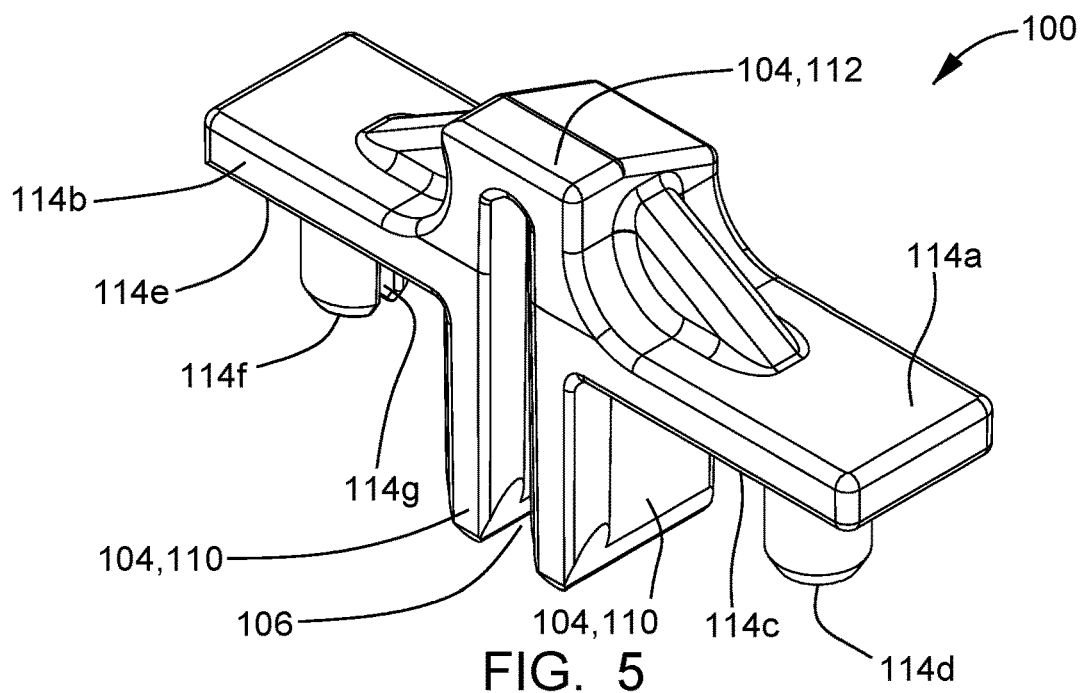
FIG. 5 is an isometric view of the brush spring retainer of FIG. 4.
Figure 6:
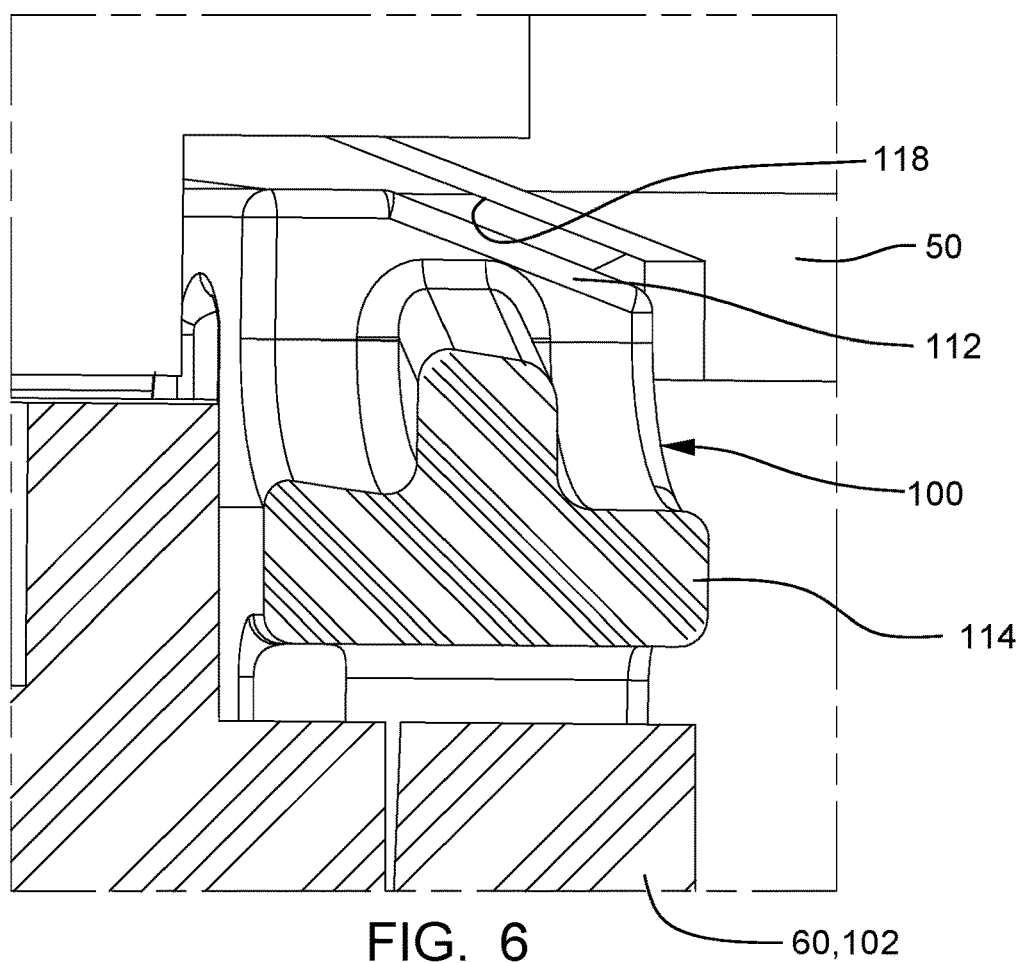
FIG. 6 is a view showing a portion of the brush spring retainer in a recess of an end cap of the fluid pump.

Brush spring retainer 100 allows for a simplified design of first electrical terminal 74 and second electrical terminal 78 since they do not need features which retain first brush spring 86 and second brush spring 90. This simplified design of first electrical terminal 74 and second electrical terminal 78 allows for easier and less costly manufacturing thereof. Brush spring retainer 100 also allows for simplified assembly of fuel pump 10. More specifically, first carbon brush 80 and second carbon brush 82 can be assembled into first brush holder 84 and second brush holder 88 respectively with first brush spring 86 and second brush spring 90 already in contact with brush spring retainer support arm 114 such that brush spring retainer 100 is assembled to motor frame 60 by inserting support stem 102 into brush spring retainer opening 106 in an interference fit. As can be seen in FIGS. 1 and 3, this can be easily accomplished because each of the elements is easily accessible and easily manipulated. Alternatively, first brush spring 86 and second brush spring 90 can be placed in contact with brush spring retainer support arm 114 after first carbon brush 80 and second carbon brush 82 are assembled into first brush holder 84 and second brush holder 88 respectively.

While this invention has been described in terms of preferred embodiments thereof, it is not intended to be so limited, but rather only to the extent set forth in the claims that follow.

We claim:

1. A fluid pump comprising:
    a hollow housing;
    an electric motor located within said hollow housing and having an armature with a commutator, said armature being rotatable about an axis with application of an electric current to said commutator, said electric motor also having a motor frame which supports a pair of permanent magnets which are located radially outward from said armature, said motor frame having a support stem extending axially away therefrom in a direction away from said commutator;
    a pump section rotationally coupled to said electric motor which receives fluid at a relatively low pressure through a fluid inlet and which pressurizes said fluid to a relatively high pressure as a result of rotation of said armature;
    a first motor brush and a second motor brush which deliver said electric current to said commutator and which are urged into electrical contact with said commutator by a first brush spring and a second brush spring respectively; and
    a brush spring retainer upon which said first brush spring and said second brush spring are each mechanically grounded, thereby causing said first brush spring and said second brush spring to hold said first motor brush and said second motor brush respectively in contact with said commutator, said brush spring retainer comprising:
        a brush spring retainer central portion which extends along said axis and which includes a brush spring retainer opening therein within which said support stem is received in an interference fit which retains said brush spring retainer to said motor frame; and
        a brush spring retainer support arm which extends from said brush spring retainer central portion in a direction laterally relative to said axis, wherein said first brush spring and said second brush spring are mechanically grounded to said brush spring retainer support arm;
    wherein said brush spring retainer central portion includes a first leg and a second leg such that said first leg and said second leg are spaced apart from each other in the direction laterally relative to said axis and such that said brush spring retainer opening is located between said first leg and said second leg; and
    wherein said first leg and said second leg are connected to each other only at respective first ends thereof which are distal from said commutator, thereby causing respective second ends of said first leg and said second leg which are proximal to said commutator to be elastically displaced from each other by said interference fit.

2. The fluid pump as in claim 1, wherein said brush spring retainer support arm includes a support arm first portion which extends from said first leg and also includes a support arm second portion which extends from said second leg.

3. The fluid pump as in claim 2, wherein a portion of said brush spring retainer opening is located laterally between said support arm first portion and said support arm second portion.

4. The fluid pump as in claim 2, wherein:
    said support arm first portion includes a first lower surface with which said first brush spring is engaged;
    said support arm first portion includes a first protrusion extending from said first lower surface in a direction toward said commutator such that said first brush spring circumferentially surrounds said first protrusion and such that said first protrusion limits movement of said first brush spring in the direction laterally relative to said axis;
    said support arm second portion includes a second lower surface with which said second brush spring is engaged; and
    said support arm second portion includes a second protrusion extending from said second lower surface in the direction toward said commutator such that said second brush spring circumferentially surrounds said second protrusion and such that said second protrusion limits movement of said second brush spring in the direction laterally relative to said axis.

5. The fluid pump as in claim 4, wherein said second protrusion includes a protrusion slot extending therethrough such that a ground wire is received within said protrusion slot and such that said ground wire is in electrical contact with said second brush spring, said ground wire extending to said hollow housing, thereby placing said second motor brush in electrical communication with said hollow housing.

6. The fluid pump as in claim 1, wherein said brush spring retainer support arm includes a support arm first portion which extends from said brush spring retainer central portion and also includes a support arm second portion which extends from said brush spring retainer central portion.

7. The fluid pump as in claim 1 further comprises an end cap which closes one end of said hollow housing and includes a fluid outlet from which the pressurized said fluid is discharged, wherein said end cap includes a recess defined therein which prevents said brush spring retainer from being disengaged from said support stem.

8. The fluid pump as in claim 7, wherein said recess of said end cap receives only a portion of said brush spring retainer central portion therein.

9. The fluid pump as in claim 1 further comprising a ground wire which is in electrical contact at one end with said second brush spring and said brush spring retainer support arm and which is in electrical contact at another end with said hollow housing such that said ground wire places said second motor brush in electrical communication with said hollow housing.

10. The fluid pump as in claim 1, wherein:
said motor frame includes a first brush holder within which said first motor brush is located such that said first brush holder constrains said first motor brush laterally relative to said axis and allows movement of said first motor brush parallel to said axis;
said motor frame includes a second brush holder within which said second motor brush is located such that said second brush holder constrains said second motor brush laterally relative to said axis and allows movement of said second motor brush parallel to said axis; and
said support stem is located laterally relative to said axis between said first brush holder and said second brush holder.

11. The fluid pump as in claim 1, wherein said support stem is located laterally relative to said axis between said first motor brush and said second motor brush.

12. The fluid pump as in claim 1, wherein:
said first brush spring is held in compression by said first motor brush and by said brush spring retainer support arm; and
said second brush spring is held in compression by said second motor brush and by said brush spring retainer support arm.

13. A fluid pump comprising:
a hollow housing;
an electric motor located within said hollow housing and having an armature with a commutator, said armature being rotatable about an axis with application of an electric current to said commutator, said electric motor also having a motor frame which supports a pair of permanent magnets which are located radially outward from said armature, said motor frame having a support stem extending axially away therefrom in a direction away from said commutator;
a pump section rotationally coupled to said electric motor which receives fluid at a relatively low pressure through a fluid inlet and which pressurizes said fluid to a relatively high pressure as a result of rotation of said armature;
a first motor brush and a second motor brush which deliver said electric current to said commutator and which are urged into electrical contact with said commutator by a first brush spring and a second brush spring respectively; and
a brush spring retainer upon which said first brush spring and said second brush spring are each mechanically grounded, thereby causing said first brush spring and said second brush spring to hold said first motor brush and said second motor brush respectively in contact with said commutator, said brush spring retainer comprising:
a brush spring retainer central portion which extends along said axis and which includes a brush spring retainer opening therein within which said support stem is received in an interference fit which retains said brush spring retainer to said motor frame; and
a brush spring retainer support arm which extends from said brush spring retainer central portion in a direction laterally relative to said axis, wherein said first brush spring and said second brush spring are mechanically grounded to said brush spring retainer support arm;
wherein said brush spring retainer central portion includes a first leg and a second leg such that said first leg and said second leg are spaced apart from each other in the direction laterally relative to said axis and such that said brush spring retainer opening is located between said first leg and said second leg; and
wherein said first leg and said second leg each have a respective rib which faces toward said brush spring retainer opening and which has a ridgeline that extends along said axis and engages with said support stem.

14. The fluid pump as in claim 13, wherein said first leg and said second leg are connected to each other only at respective first ends thereof which are distal from said commutator, thereby causing respective second ends of said first leg and said second leg which are proximal to said commutator to be elastically displaced from each other by said interference fit.

15. A fluid pump comprising:
a hollow housing;
an electric motor located within said hollow housing and having an armature with a commutator, said armature being rotatable about an axis with application of an electric current to said commutator, said electric motor also having a motor frame which supports a pair of permanent magnets which are located radially outward from said armature, said motor frame having a support stem extending axially away therefrom in a direction away from said commutator;
a pump section rotationally coupled to said electric motor which receives fluid at a relatively low pressure through a fluid inlet and which pressurizes said fluid to a relatively high pressure as a result of rotation of said armature;
a first motor brush and a second motor brush which deliver said electric current to said commutator and which are urged into electrical contact with said commutator by a first brush spring and a second brush spring respectively; and
a brush spring retainer upon which said first brush spring and said second brush spring are each mechanically grounded, thereby causing said first brush spring and said second brush spring to hold said first motor brush and said second motor brush respectively in contact with said commutator, said brush spring retainer comprising:
a brush spring retainer central portion which extends along said axis and which includes a brush spring retainer opening therein within which said support stem is received in an interference fit which retains said brush spring retainer to said motor frame; and
a brush spring retainer support arm which extends from said brush spring retainer central portion in a direction laterally relative to said axis, wherein said first brush spring and said second brush spring are mechanically grounded to said brush spring retainer support arm;
wherein said brush spring retainer support arm includes a support arm first portion which extends from said brush spring retainer central portion and also includes a support arm second portion which extends from said brush spring retainer central portion;

wherein said support arm first portion includes a first lower surface with which said first brush spring is engaged;

wherein said support arm first portion includes a first protrusion extending from said first lower surface in a direction toward said commutator such that said first brush spring circumferentially surrounds said first protrusion and such that said first protrusion limits movement of said first motor brush in the direction laterally relative to said axis;

wherein said support arm second portion includes a second lower surface with which said first brush spring is engaged; and wherein said support arm second portion includes a second protrusion extending from said second lower surface in the direction toward said commutator such that said second brush spring circumferentially surrounds said second protrusion and such that said second protrusion limits movement of said second motor brush in the direction laterally relative to said axis.

16. The fluid pump as in claim 15, wherein:

said brush spring retainer central portion includes a first leg and a second leg such that said first leg and said second leg are spaced apart from each other in the direction laterally relative to said axis and such that said brush spring retainer opening is located between said first leg and said second leg; and said first leg and said second leg are connected to each other only at respective first ends thereof which are distal from said commutator, thereby causing respective second ends of said first leg and said second leg which are proximal to said commutator to be elastically displaced from each other by said interference fit.

17. A fluid pump comprising:

a hollow housing;

an electric motor located within said hollow housing and having an armature with a commutator, said armature being rotatable about an axis with application of an electric current to said commutator, said electric motor also having a motor frame which supports a pair of permanent magnets which are located radially outward from said armature, said motor frame having a support stem extending axially away therefrom in a direction away from said commutator;

a pump section rotationally coupled to said electric motor which receives fluid at a relatively low pressure through a fluid inlet and which pressurizes said fluid to a relatively high pressure as a result of rotation of said armature;

a first motor brush and a second motor brush which deliver said electric current to said commutator and which are urged into electrical contact with said commutator by a first brush spring and a second brush spring respectively;

a brush spring retainer upon which said first brush spring and said second brush spring are each mechanically grounded, thereby causing said first brush spring and said second brush spring to hold said first motor brush and said second motor brush respectively in contact with said commutator, said brush spring retainer comprising:

a brush spring retainer central portion which extends along said axis and which includes a brush spring retainer opening therein within which said support stem is received in an interference fit which retains said brush spring retainer to said motor frame; and a brush spring retainer support arm which extends from said brush spring retainer central portion in a direction laterally relative to said axis, wherein said first brush spring and said second brush spring are mechanically grounded to said brush spring retainer support arm; and a ground wire which is in electrical contact at one end with said second brush spring and said brush spring retainer support arm and which is in electrical contact at another end with said hollow housing such that said ground wire places said second motor brush in electrical communication with said hollow housing;

wherein said ground wire is captured axially between said brush spring retainer support arm and said second brush spring.

18. The fluid pump as in claim 17, wherein:

said brush spring retainer central portion includes a first leg and a second leg such that said first leg and said second leg are spaced apart from each other in the direction laterally relative to said axis and such that said brush spring retainer opening is located between said first leg and said second leg; and said first leg and said second leg are connected to each other only at respective first ends thereof which are distal from said commutator, thereby causing respective second ends of said first leg and said second leg which are proximal to said commutator to be elastically displaced from each other by said interference fit.

* * * * *